(12) United States Patent
Silver (10) Patent No.: US 7,352,854 B1
(45) Date of Patent: Apr. 1, 2008

(54) CALL WAITING SUPPRESSION

(75) Inventor: Edward Michael Silver, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 968 days.

(21) Appl. No.: 10/673,849

(22) Filed: Sep. 29, 2003

(51) Int. Cl.
H04M 3/42 (2006.01)

(52) U.S. Cl. .............................. 379/207.16; 379/215.01

(58) Field of Classification Search ........... 379/207.16, 379/215.01, 88.21, 88.26, 142.08, 210.01, 379/211.02, 214.01
See application file for complete search history.

(56) References Cited

U.S. PATENT DOCUMENTS

| | | | |
|---|---|---|---|
| 4,266,098 A | 5/1981 | Novak | |
| 4,277,649 A | 7/1981 | Sheinbein | |
| 4,468,541 A | 8/1984 | Cohen | |
| 4,791,664 A | 12/1988 | Lutz et al. | |
| 4,802,202 A | 1/1989 | Takahashi et al. | |
| 4,817,133 A | 3/1989 | Takahashi et al. | |
| 4,845,743 A | 7/1989 | Lutz | |
| 4,850,013 A | 7/1989 | Rose | |
| 5,029,196 A | 7/1991 | Morganstein | |
| 5,109,405 A | 4/1992 | Morganstein | |
| 5,157,712 A | 10/1992 | Wallen, Jr. | |
| 5,161,181 A | 11/1992 | Zwick | |
| 5,200,994 A | 4/1993 | Sasano et al. | |
| 5,341,411 A | 8/1994 | Hashimoto | |
| 5,347,574 A | 9/1994 | Morganstein | |
| 5,351,289 A | 9/1994 | Logsdon et al. | |
| 5,361,295 A | 11/1994 | Solomon et al. | |
| 5,388,150 A | 2/1995 | Schneyer et al. | |
| 5,425,082 A | 6/1995 | Quirk | |
| 5,425,092 A * | 6/1995 | Quirk | 379/215.01 |
| 5,446,785 A | 8/1995 | Hirai | |
| 5,452,346 A | 9/1995 | Miyamoto | |
| 5,467,388 A | 11/1995 | Redd et al. | |
| 5,490,205 A | 2/1996 | Kondo et al. | |
| 5,497,414 A | 3/1996 | Bartholomew | |
| 5,533,106 A | 7/1996 | Blumhardt | |
| 5,535,265 A | 7/1996 | Suwandhaputra | |
| 5,546,447 A | 8/1996 | Skarbo et al. | |
| 5,546,451 A * | 8/1996 | Shen | 379/215.01 |
| 5,550,900 A | 8/1996 | Ensor et al. | |
| 5,563,935 A | 10/1996 | Small | |
| 5,602,908 A | 2/1997 | Fan | |
| 5,604,797 A | 2/1997 | Adcock | |
| 5,636,269 A | 6/1997 | Eisdorfer | |

(Continued)

OTHER PUBLICATIONS

U.S. Appl. No. 10/673,649, filed Sep. 29, 2003, Edward Michael Silver.

(Continued)

Primary Examiner—William J. Deane, Jr.
(74) Attorney, Agent, or Firm—Scott P. Zimmerman, PLLC (57) ABSTRACT

Systems and method for call waiting suppression are disclosed. When a communications device is engaged in an active communication and receives an incoming communication, a call waiting alert is activated to produce a single, initial audible alert, and thereafter the subsequent call waiting alert(s) are silenced according to a call waiting suppression profile. Alteratively, an audible indicator of the call waiting alert may be deactivated for the incoming communication, while other indicators remain active to alert the receiving party of the incoming communication.

24 Claims, 8 Drawing Sheets

U.S. PATENT DOCUMENTS

| | | |
|---|---|---|
| 5,737,400 A | 4/1998 | Bagchi et al. |
| 5,764,748 A | 6/1998 | Rosenthal et al. |
| 5,812,648 A | 9/1998 | Wanner |
| 5,999,207 A | 12/1999 | Rodriguez et al. |
| 6,002,783 A | 12/1999 | Lester et al. |
| 6,058,171 A | 5/2000 | Hoopes |
| 6,219,409 B1 | 4/2001 | Smith et al. |
| 6,289,092 B1 * | 9/2001 | Nishiara ................ 379/215.01 |
| 6,298,122 B1 | 10/2001 | Horne |
| 6,400,814 B1 | 6/2002 | Adams |
| 6,442,249 B1 | 8/2002 | Miller, Jr. |
| 6,496,569 B2 | 12/2002 | Pelletier et al. |
| 6,498,841 B2 | 12/2002 | Bull et al. |
| 6,631,188 B1 * | 10/2003 | Sands .................... 379/215.01 |
| 2002/0141559 A1 * | 10/2002 | Gurgun ................ 379/215.01 |

OTHER PUBLICATIONS

U.S. Appl. No. 10/673,949, filed Sep. 29, 2003, Edward Michael Silver.

* cited by examiner

CALL WAITING SUPPRESSION

CROSS REFERENCE TO RELATED APPLICATIONS

This application relates to applicants' co-pending application entitled "Timed Ring Suppressor," filed on Jun. 30, 2003, and of which the "Brief Summary of the Invention" and "Detailed Description of the Invention" sections are incorporated herein by this reference.

This application relates to applicants' co-pending application entitled "Network-Based Timed Ring Suppression," filed Jun. 30, 2003, and of which the "Brief Summary of the Invention" and "Detailed Description of the Invention" sections are incorporated herein by this reference.

This application relates to applicants' co-pending application entitled "Caller Controlled Network-Based Timed Ring Suppression," filed Jun. 30, 2003, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invnetion

This invention relates generally to the field of communications. More particularly, this invention relates to systems and methods for call waiting suppression of an incoming communications signal to a communications device engaged in an ongoing communication.

2. Description of the Related Art

Telecommunications has experienced explosive growth, and more growth is planned as telecommunication access and numerous communications devices improve. This explosive growth is revolutionizing telecommunications services offered to subscribing customers. Of the service offering, the most relevant to this invention is the Call Waiting Caller Identification (Caller ID) services. A customer or a user of a telephone that is served by the Call Waiting Caller ID service is notified of an incoming call while the customer is engaged in an ongoing conversation (e.g., during a conversation with another party), is provided with directory information for the incoming call, and is enabled to interrupt the ongoing conversation to answer the incoming call. Typically, the customer is notified of the incoming call by an audible alert that is played when the incoming call is initially connected to a called telephone and then notified again by another audible alert that is played after an amount of time has elapsed. Along with the audible alert of the Call Waiting Caller ID services, the directory information of associated with a calling party's telephone number is provided to the called telephone or other display device associated with the called telephone. This directory information may include the calling party's telephone number, a geographic identifier, and/or a billing name or other information associated with the calling party's telephone number (if available) when an incoming caller line identification (ICLID) signal of the incoming call can be detected, decoded, and transmitted by a communications network servicing the called telephone.

The customer may respond to the audible alert(s) and/or use the displayed Call Waiting Caller ID information to make a decision to interrupt or terminate the ongoing conversation in order to answer and/or to prepare for the secondary incoming call. If the customer wants to selectively control incoming calls using Call Waiting Caller ID information, the customer has several choices—block all incoming calls, block a selected phone number (or alternate number associated with a phone number) of an incoming call, or ignore the audible alerts until the incoming call is further processed (e.g., answered by a network voice massaging system (or other call handling system) or until the caller hangs up). If the customer blocks all incoming calls during, then the customer is not audibly notified of any incoming calls during the ongoing conversation. If the phone number of the incoming call is blocked, then the customer may not have immediate notification of the incoming blocked communication to re-evaluate whether to accept the communication since circumstances for accepting the communication may change. If the customer ignores the incoming call and listens to unwanted audible alerts, then the customer may be annoyed and/or distracted with the repetitive noise alerting the customer of the incoming call. Thus, there is a need for improved systems and methods for handling an incoming call that minimizes an interruption of and/or a termination of an ongoing conversation.

BRIEF SUMMARY OF THE INVENTION

This invention addresses the above and other needs by providing systems and methods for enabling call waiting suppression. Typically, a customer receives an incoming communication to a communications device that is engaged in an ongoing communication (e.g., a conversation). According to embodiments, one or more alerts of the incoming communication may be suppressed according to a call waiting suppression profile or, alternatively, according to call waiting suppression defaults. According to other embodiments, an initial audible alert is presented to the communications device (e.g., a tone generated by the communications network and played to the communications device during the active conversation) to provide a single alert of the incoming communication. Thereafter, a subsequent audible alert may be suppressed for a selected time period during the ongoing communication. The time period for silencing the subsequent alert is controlled by a timing parameter that may have an initial default to suppress an additional audible alert of the incoming communication. Alternatively, the timing parameter may be selected for predetermined periods of time by a customer (and/or user) of the communications device, and further, the timing parameter may be set differently for different callers (also referred to as calling party) such that if a selected caller repetitively calls during the ongoing conversation, the subsequent call waiting alerts of each subsequent incoming communication are deactivated according to the timing parameter. The call waiting suppression may be controlled by customer premise hardware and equipment including a telephone (or alternate communications device) with a built in (or otherwise integrated) call waiting suppressor or by a stand-alone call waiting suppressor coupled with the telephone. In alternative embodiments, the call waiting suppression may be controlled by a communications network that detects, decodes, and processes call waiting suppression of the incoming communication to the communications device. Additionally, emergency personnel, authorized calling parties, and other authorized entities (e.g., a technician of the communications network) may override the call waiting suppression to continuously alert the customer (or another receiving party) of the incoming communication.

Other systems, methods, and/or computer program products according to embodiments will be or become apparent to one with skill in the art upon review of the following drawings and detailed description. It is intended that all such additional systems, methods, and/or computer program products be included within this description, be within the scope of this invention, and be protected by the accompanying claims.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustraing systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The call waiting suppression systems and methods of this invention operate with different communications devices and communications networks to enable, disable and/or otherwise control call waiting suppression. The call waiting suppression systems and methods leverage the assets of the connected communications device(s) and/or communications networks in terms optimally using the connected software, hardware, equipment, networks, and/or other information technology assets. For example, a receiving party's (also referred to herein as a "customer" or a "user") communications device may have a local and/or a wide area network that utilizes Ethernet, dedicated private lines, Frame Relay, ISDN, ATM, ADSL, and the like to provide a high speed connection to a data network, such as the Internet, Intranet, and/or Extranet. Typically, the receiving party receives an incoming communication to a communications device engaged in an ongoing communication (e.g., a conversation) and is alerted of the incoming communication with an audible alert (e.g., a tone) produced by a mechanical/electrical generator (or alternate noise maker) of the communications network. Thereafter, subsequent audible alerts may be suppressed for a selected time period such that one or more subsequent audible alerts of the incoming communication (or subsequent incoming communications) are silenced during the ongoing conversation. The time period for silencing the audible alert(s) is controlled by a time parameter (also referred to as a "timing parameter") that may have an initial default to suppress one successive alert (e.g., the second tone of the incoming communication that is presented by the communications network to the communications device). Alternatively, the time parameter may be selected for predetermined periods of time by a customer (and/or user) of the communications device, and further, the time parameter may be set differently for different callers (also referred to as calling party). The time parameter may also be selected to suppress a certain number of subsequent alerts. The time parameter, for example, may be selected to provide a single alert and, then, suppress the subsequent two alerts. The time parameter could also be selected to provide two successive alerts and, then, suppress the following three alerts. The time parameter, in shot, may be customized/selected to suit the individual customer's desires. The call waiting suppression may be controlled by customer premise hardware and equipment including a telephone (or alternate communications device) with a built in (or otherwise integrated) call waiting suppressor. The call waiting suppression may additionally or alternatively be controlled by a stand-alone call waiting suppressor coupled with the telephone. In alternate embodiments, the call waiting suppression may be controlled by a communications network that detects, decodes, and processes call waiting suppression of the incoming communication to the communications device. Additionally, emergency personnel, authorized calling parties, and other authorized entities (e.g., a technician of the communications network) may override the call waiting suppression to continuously audibly alert the customer (or another receiving party) of the incoming communication during the ongoing conversation.

As used herein, the term "communications device" includes wired and wireless communications devices, such as a plain old telephone (POTS phone), a mobile phone, a wireless phone, a WAP phone, a satellite phone, a computer, a modem, a pager, a digital music device (e.g., MP3/4 player), a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with the receiving party, and/or (4) call waiting suppression profiles, including configuration, authenticity, security, and other data. In various embodiments, the data may be stored by the communications network, a peripheral storage device connected to the communications network, the call waiting suppressor device, the communications device, a peripheral storage device connected to the communications device, and/or other connected networks.

Figure 1:
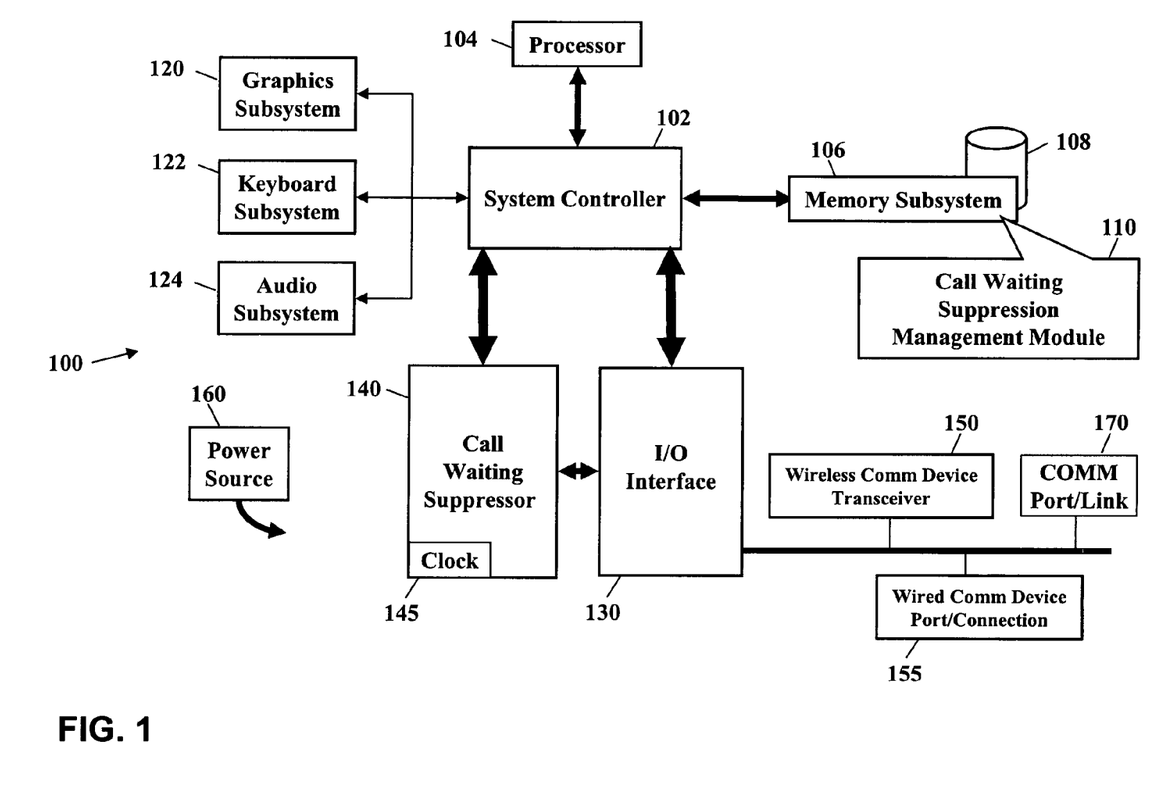
FIG. 1 is a block diagram of a call waiting suppressor device according to embodiments of this invention.

Referring now to the figures, FIG. 1 is a block diagram showing a call waiting suppressor device 100. The call waiting suppressor device 100 includes a system controller 102, a processor 104, a memory subsystem 106, a database 108, a Call Waiting Suppression Management Module (also referred to herein as the "Call Waiting Suppression Program") 110, a graphics subsystem 120, a keyboard subsystem 122, an audio subsystem 124, an input/output (I/O) interface 130, a Call Waiting suppressor 140, a clock 145, a wireless communications device transceiver 150, a wired communications device port/connection 155, a power source 160, and a communications "COMM" link 170. The system controller 102, as known in the art, provides a bridging function between the processor, the graphics subsystem 120, the keyboard subsystem 122, the audio subsystem 124, the memory subsystem 106, the call waiting suppressor 114, and the interface 130. The interface 130 may include a peripheral bus controller that is an integrated circuit serving as an input/output hub for various peripheral ports. These peripheral ports enable the call waiting suppressor 140 to control and/or to communicate with a variety of communications devices through the Wireless Comm Device Transceiver 130 (such as I.E.E.E. 802.11 family and Infrared) and the Wired Comm Device Port 155 (such as modem V90+ and compact flash slots). In addition, a Call Waiting Suppression Profile that provides Call Waiting suppression preferences may be stored by the local memory system 106 or by a peripheral storage device (such as CWS DataServer 540 shown in FIG. 5). According to an embodiment, the Wired Comm Device Port 155 may communicate the Call Waiting Suppression Profile for a connected or integrated communications device (via the Wireless Comm Device Transceiver 150 and/or Wired Comm Device Port/Connection 155), and, the connected or integrated communications device would then initiate communications with a communications network (such as reference numeral 430 in FIG. 4) and transmit the Call Waiting Suppression Profile (via the connected or integrated communications device). Still, in other alternate embodiments, the interface 130 may include intelligent componentry that detects or otherwise identifies the receiving party's communications device and formats or otherwise configures the call waiting suppression profile or enables call waiting suppression for the receiving party's communications device.

Typically, as known in the art, a system bus communicates signals, such as data signals, control signals, and address signals, between the processor 104 and the system controller 102. The processor 104 executes an operating system that controls the internal functions of the call waiting suppressor device 100. The call waiting suppression program 110 operates within the system memory 106; however, the call waiting suppression program 110 could also reside in flash memory or a peripheral storage device. In an embodiment, the I/O Interface 130 allows the call waiting suppressor device 100 to monitor, detect, receive, and decode an incoming communication identification (ICLID) signal of an incoming telephone call. Alternatively, the call waiting suppressor device 100 may receive the ICLID signal from a peripheral device (not shown). The call waiting suppression program 110 compares reference data transmitted with the ICLID signal to data stored in one or more call waiting suppression profiles sorted in memory 106 (or, as further described below, stored in peripheral memory such as a CWS DataServer 540 of FIG. 5) to activate the call waiting suppressor 140 and/or to enable a circuit (e.g., reference numeral 415 in FIG. 4) of the communications network to suppress the call waiting indicator to the connected communications device. Further, a timing parameter of the call waiting suppression profile specifies the time period to deactivate the Call Waiting alert/indicator and, if applicable, to enable subsequent alerts/indicators after the time period has passed. The timing parameter may have any value, however, the timing parameter typically ranges from approximately one second to about two minutes to correspond with an amount of time that a calling party usually waits for the receiving party to answer the call. The timing parameter may also be greater than two minutes (and may be for any duration) such that the timing parameter is effective for the duration of an ongoing communication. According to embodiments of this invention, the timing parameter may suppress subsequent alerts and/or indicators of the incoming communication after an initial alert (e.g., a tone) of the incoming communication is presented to the communications device (and/or peripheral equipment coupled with the communications device). Thus, the customer (or another receiving party) is typically provided an initial audible alert of the incoming communication. Alternatively, the audible alert may be programmed to notify the customer of the incoming communication after a suppressed amount of time. That is, the initial alert is suppressed according to the time parameter, and then according to the time parameter, a subsequent alert is activated to notify the customer of the incoming call. This alternative embodiment of suppressing the initial notification of the incoming communication may be particularly desirable for hearing impaired customer who might want his/her hearing aid to "settle" down (e.g., filter) out non-voice frequencies until they recognize the caller of the incoming conversation and/or identify the topic. Once the call waiting suppression profile is associated, the processor 104 and the clock source 145 operate with the call waiting suppressor 140 to suppress subsequent alerts/indicators according to the timing parameter. Alternatively, the call waiting suppressor may be manually activated by a punch button to suppress one or more subsequent call waiting alerts/indicators.

According to embodiments of this invention, the input/output interface 130 is a microprocessor that includes memory (not shown), communication controllers (not shown), and peripheral controllers (not shown). The communication controllers, for example, could control packet-based communications with a data network (shown as reference numeral 560 in FIGS. 5-6) through the COMM link 170. The communication controllers could also control packet-based communications with a telecommunications switch (shown as reference numeral 415 of FIGS. 4-6) through the COMM link 170. The clock source 145 provides a system clock for the call waiting suppressor device 100, and the clock source 145 may also include higher and lower frequency multiples of the system clock depending upon power requirements and power availability. The power management system 160 provides differing power control mechanisms, such as a sleep mode and a low-power mode, to efficiently utilize available power and to reduce thermal management concerns. Further, the power management system 160 may include a rechargeable battery to provide power and allow the call waiting suppression device 100 to be portable.

According to embodiments of this invention, the peripheral controllers of the input/output interface 130 (and/or peripheral controllers of the processor 104) may provide an interface with the attached peripherals including, for example, a voice/video player (shown as graphics subsystem 120 and audio subsystem 124), a voice/video recorder (shown as graphics subsystem 120 and audio subsystem 124), a biometrics sensor (not shown), a display (such as an LCD/LED/CRT display of graphics subsystem 120), a keypad of keyboard subsystem 122, and the COMM port 130. The call waiting suppression program 110 may cooperate with the operating system and with the peripherals to provide a graphical user interface (GUI) for the call waiting suppression program 110. The GUI provides a convenient visual and/or audible interface with the user of the call waiting suppression device 100. As is apparent to those of ordinary skill in the art, the user (e.g., the customer) interacts with the call waiting suppression program 110 over a variety of mediums, such as, for example, a stylus (not shown), keyboard 122, and/or punch buttons (not shown) of the keyboard subsystem 122 or graphics subsystem 120, a display screen of the graphics subsystem 120, and/or a voice-activated menu prompt of the audio subsystem 124. Additionally, the peripheral bus controller may provide an interface with a biometrics sensor (not shown), such as, for example, a fingerprint ID device. The biometrics sensor may provide security features that prevent unauthorized users from exploiting the call waiting suppression device 100. The biometrics senor could also comprise retina recognition device and software, DNA/RNA recognition device and software, facial recognition device and software, speech recognition device and software, and/or scent recognition device and software.

The call waiting suppression program 110 may be physically embodied and/or otherwise stored on or in a computer-readable medium. This computer-readable medium may include CD-ROM, DVD, tape cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-customers, licensees, and assignees. These types of computer-readable media, and other types not mentioned here but considered within the scope of this invention, allow the call waiting suppression program 110 to be easily disseminated. A computer program product, according to the embodiments of this invention, comprises the call waiting suppression program 110 stored on a computer-readable medium. The call waiting suppression program 110 may include the Call Waiting Suppression Profile and/or Call Waiting suppression preferences as described herein.

The processor (such as reference numerals 104 and 130 to FIG. 1) is typically a microprocessor. Advanced Micro Devices, Inc., for example, manufactures a full line of microprocessors, such as the ATHLON™ (ATHLON™ is a trademark of Advanced Micro Devices, Inc., one AMD Place, P.O. Box 3453, Sunnyvale, Calif. 94088-3453, 408.732.2400, 800.538.8450, www.amd.com). Sun Microsystmes also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufactures also offer microprocessors. Such other manufactures include Motorola, Inc. (1303 East Algonquin Road, P.O. Box A3309 Schaumbury, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

Typically, the customer creates, modifies, and/or otherwise manages one or more call waiting suppression profiles by inputting information. For example, the call waiting suppression device may include an interactive GUI and/or punch buttons (and/or other interactive controls to input data) that allow the customer to (1) input default call waiting suppression parameters and/or (2) input customized call waiting parameters that include (a) inputting a new address (e.g., telephone number) or (b) accessing a call waiting suppression caller identification organizer that stores and sorts data by (i) a telephone number associated with the incoming line identification signal, (ii) an outgoing telephone number dialed from the communications device, and/or (iii) a name associated with a telephone number, an outgoing telephone number, and/or a caller control signal. For example, if the customer inputs a specified communications address for call waiting suppression, then the customer may be prompted by another GUI (and/or other interactive controller) to associate the address with a name and/or with a communications device so that when a call is received from that number and matched with the call waiting suppression profile, a display device of (and/or coupled with) the receiving party's communications device provides the telephone number, name, communications device, and/or information such as a data/time of the incoming communication, a geographic location identifier of the call, a calling party control/password to override call waiting suppression, and other information associated with the incoming communications. Still further, the customer may be prompted by another GUI to associate and to select a timing parameter that defines the time period for deactivating the call waiting indicator of an incoming communication from a particular communications address. The timing parameter may also specify a time period to re-activate the call waiting indicator.

Alternatively, the call waiting suppression profile may deactivate an audible alert, such as a tone and/or announcement of the incoming communication, but allow a visual alert, such as Caller Identification (Caller ID) information that is displayed to the receiving party's communications device or to equipment coupled with the receiving party's communications device. For example, the customer may elect to suppress an audible call waiting indicator for incoming calls from his/her mother (via a phone number associated with his/her mother in a call waiting suppression profile) but allow a visual indicator for the incoming call from his/her mother. That way, the customer is not audibly alerted of the incoming call from his/her mother, but has a visual alert to view either when the incoming call is first routed or to later view stored Caller ID information which may also include an identifier that the call was call waiting suppressed. Another example may be to use call waiting suppression to suppress all audible call waiting alerts for unknown or blocked numbers, that is, an audible alert of the incoming communication having the unknown or blocked number is always suppressed when the receiving party's communications device is engaged in an ongoing communication; however, a visual alert of the incoming communication may not be suppressed and the Caller ID information (along with other call waiting suppression parameters) may be presented to a display device of (and/or coupled with) the receiving party's communications device.

Figure 2:
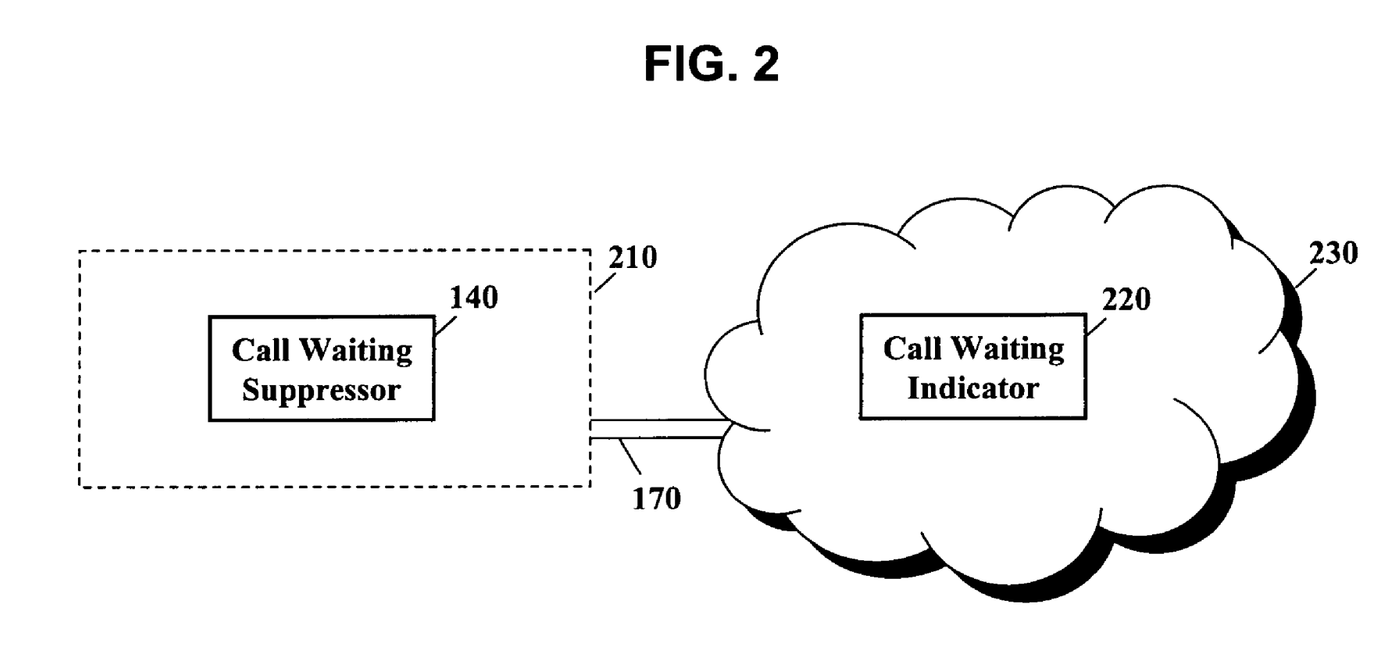
FIG. 2 is a block diagram of a call waiting suppressor device according to embodiments of this invention.

FIG. 2 is a block diagram of a manually-activated call waiting suppression device 200 that includes the call waiting suppressor 140 coupled with a receiving party's communications device 210, the communications link 170, and a call waiting indicator 220 of a communications network 230. The call waiting suppressor 140 communicates with the call waiting indicator 220 to deactivate/suppress an alert of an incoming communication to the communications device 210 while the communications device 210 is engaged in a communication. For example, if the alert is a tone and/or announcement (and or other audible alert) that is generated by the communications network 230 and played over the communications link 170 to the communications device 210, then the call waiting suppressor 140 would communicate a signal to the communications network 230 to deactivate the tone and/or announcement. Still further, if the tone is dependent on an on/off circuit, then the signal would prevent current/voltage from flowing to the tone generator (not shown), and, thus, prevent generation of the tone (i.e., maintain silence) during an off-hook state of the communications device 210. The call waiting suppressor 140 could be a punch button (not shown) that the customer presses after an incoming communication produces an initial audible alert (e.g., a tone and/or an announcement). Thereafter, subsequent audible alerts are suppressed for a selected timing parameter. For example, if the timing parameter is dynamically set to last for the duration of the ongoing communication (e.g., the time period being dynamic because each conversation may last a different amount of time; however, the network can detect when the communications device is on-hook, and off-hook to set the timing parameter), then the customer could press the call waiting suppressor 140 to silence the audible alert until the ongoing communication has ended. Alternatively, the timing parameter could be a fixed time period, such as, for example, two minutes, and, if the call waiting suppressor 140 was pressed, it would deactivate the audible alert for two minutes and after two minutes, the tone and/or audible alert would re-activate such that the communications device 210 would be alerted of subsequent incoming communications. This may be particularly useful when the customer is engaged in an ongoing communication, but for some reason, is not actually talking with the other party to let them know that they would like to answer another call (e.g., when a customer is on hold). In such cases, the customer does not want to answer then incoming communication and risk losing the communications link of the ongoing communication. According to embodiments of this invention, the customer would be notified of the incoming communication, but could thereafter suppress subsequent alerts according to the timing parameter. This could also be useful when a customer wants to re-activate call waiting alerts during the ongoing communication, and, thus, provide a reason to end the communications link of the ongoing communication (e.g., provide an excuse to get off the phone and answer the incoming call).

Figure 3:
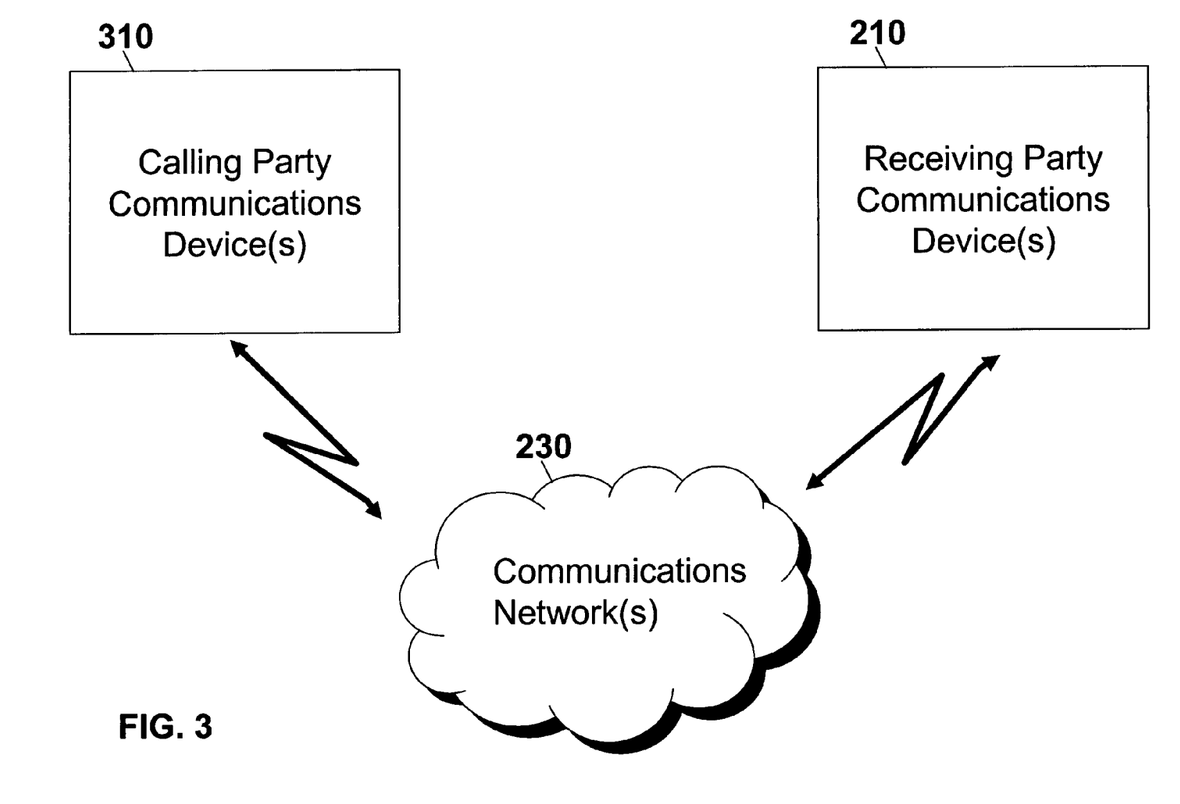
FIG. 3 is a schematic of a call waiting suppression system illustrating a communications network connecting a calling party's communications device with a receiving party's communications device according to embodiments of this invention.

FIG. 3 illustrates a call waiting suppression communications system including a receiving party's (e.g., the customer's) communications device 210, at least one communications network 220, and a calling party's communications device 310. The calling party uses communications device 310 to place a call (or other communication) over communications network 320 to the receiving party's communications device 210 that is already engaged in an ongoing communication. According to one of the embodiments, an incoming line identification (ICLID) signal associated with the incoming communication is detected, decoded, and compared with one or more call waiting suppression profiles. This comparison may be done by the call waiting suppression device 100 of FIG. 1, or alternatively, by the communications network 220. If data associated with the ICLID signal matches a call waiting suppression profile, then the call waiting suppression profile specifies a call waiting indicator and a timing parameter associated with the call waiting indicator. Alternatively, if the ICLID signal does not match a call waiting suppression profile, then default parameters may be used for call waiting suppression. The call indicators may include audible alerts, such as a tone or an announcement (e.g., talking call waiting services), visual alerts (e.g., caller identification information displayed to a Caller ID device, a light source that illuminates when an incoming communication is received or detected, etc.), a vibrating alert, and/or other sensory indicators (e.g., smell, etc.) The call waiting suppression profile typically includes data for communications addresses (such as saved addresses of incoming and outgoing calls), names and/or other identifiers of a caller, time, data, geographic and/or other network identification information associated with the ICLID signal, identification of the caller's communications device (e.g., cellular phone, satellite phone, etc.), the timing parameter to suppress the call waiting indicator associated with each available alert/indicator, and/or, if applicable, caller control override features.

As depicted in FIG. 3, the receiving party's communications device 210 does not include an integrated and/or a coupled call waiting suppression device 100. Rather, the receiving party (e.g., customer and/or user) makes use of an access number, web page, and/or other medium of the communications network 220 to access, create, modify, and/or otherwise manage one or more call waiting suppression profiles and call waiting suppression services. For example, if the customer calls an access number, the customer is prompted for authorization and/or identification (e.g., a pin number associated with a billing number, password, and/or other verification information), and thereafter, an interactive voice-activated menu may present options for the customer to select in order to access stored call waiting suppression profiles, compose and/or generate a new call waiting suppression profile including inputting one or more communications addresses, names, timing parameters, and/or other data. The communications network 220 stores the call waiting suppression profile and/or other preferences for call waiting suppression of the customer. Moreover, the call waiting suppression menu presented by telecommunications network 220 may be programmed over a verity of mediums, such as, for example, a voice-activated and/or Dual Tone Multi-Frequency (DTMF) menu prompt. The customer, for example, might select to access stored call waiting suppression profiles by entering a "1" on a touch-tone keypad or by speaking into a receiving audio subsystem and staring the word "one." This entry would then prompt the customer through choices such as accessing recently sent and/or recently received calls, alphanumeric listings of names for the calling party, and so on. After making a selection, the telecommunications network 220 retrieves the stored call waiting suppression profile from a database (such as reference numeral 545 of FIG. 5). In addition, the customer might enter a code (e.g., "*99") in order to automatically activate all waiting suppression for all incoming communications. Similarly the customer could unblock call waiting suppression by entering another code.

Figure 4:
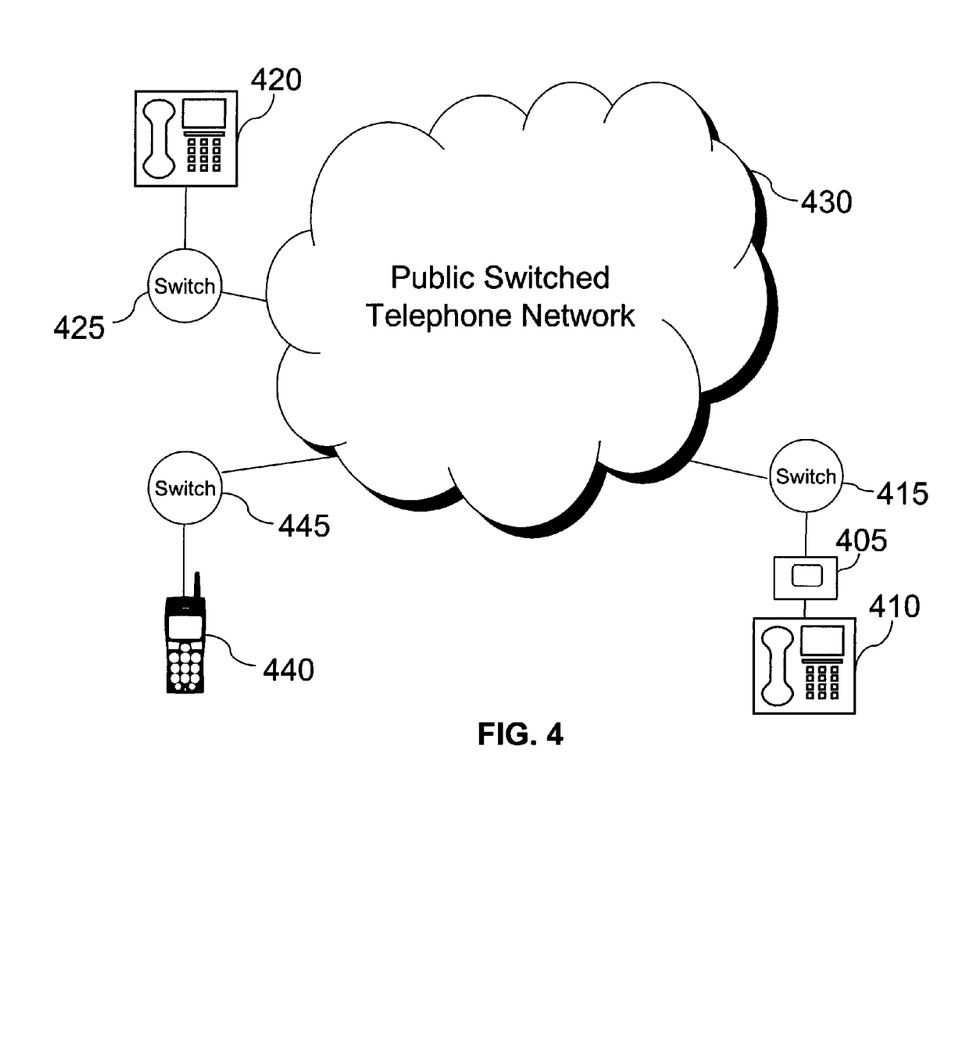
FIG. 4 is a schematic of a call waiting suppression system illustrating a public switched telephone network connecting a calling party's telephone with a receiving party's telephone engaged in an ongoing communication with a third party's telephone according to embodiments of this invention.

FIG. 4 illustrates a call waiting suppression communications system including a receiving party's (e.g., the customer's) telephone 410 coupled with a Caller ID device 405, a communications switch 415, a third party's phone 420, a switch 425, a Public Switched Telephone Network (PSTN) 430, a calling party's cellular phone 440, and switch 445. The receiving party's telephone 410 is engaged in an ongoing communication with third party telephone 420 over communications network 430 (and switches 415 and 425). An incoming call from cellular phone 440 is transmitted to an antenna (not shown), then coupled to a mobile switch (also not shown), and then routed via switch 445 into the PSTN 430. The PSTN 430 decodes and associates the ICLID signal with the incoming call. Similar to above, if reference data of the ICLID signal matches a call waiting suppression profile, then the call waiting suppression profile specifies a call waiting indicator and a timing parameter associated with the call waiting indicator. Alternatively, if the ICLID signal does not match a call waiting suppression profile, then default parameters may be used for call waiting suppression. Depending on the call waiting suppression profile associated with the incoming call, the Caller ID data (and/or associated call waiting suppression data) may be routed with the call to the communications address of the receiving party's telephone number via switch 415 and the Caller ID data may be presented to the Caller ID device 405 to identity information about the incoming call while any audible call waiting alert (e.g., a tone and/or announcement) of the incoming call are suppressed. Thus, the receiving party has a visual alert, as well as a stored record, of the incoming call, but is not audibly interrupted during the ongoing conversation with the third party. Still further, the call waiting suppression profile may specify other parameters for controlling (e.g., suppressing, deactivating, reativating, etc.) call waiting alerts as described above and below.

Figure 5:
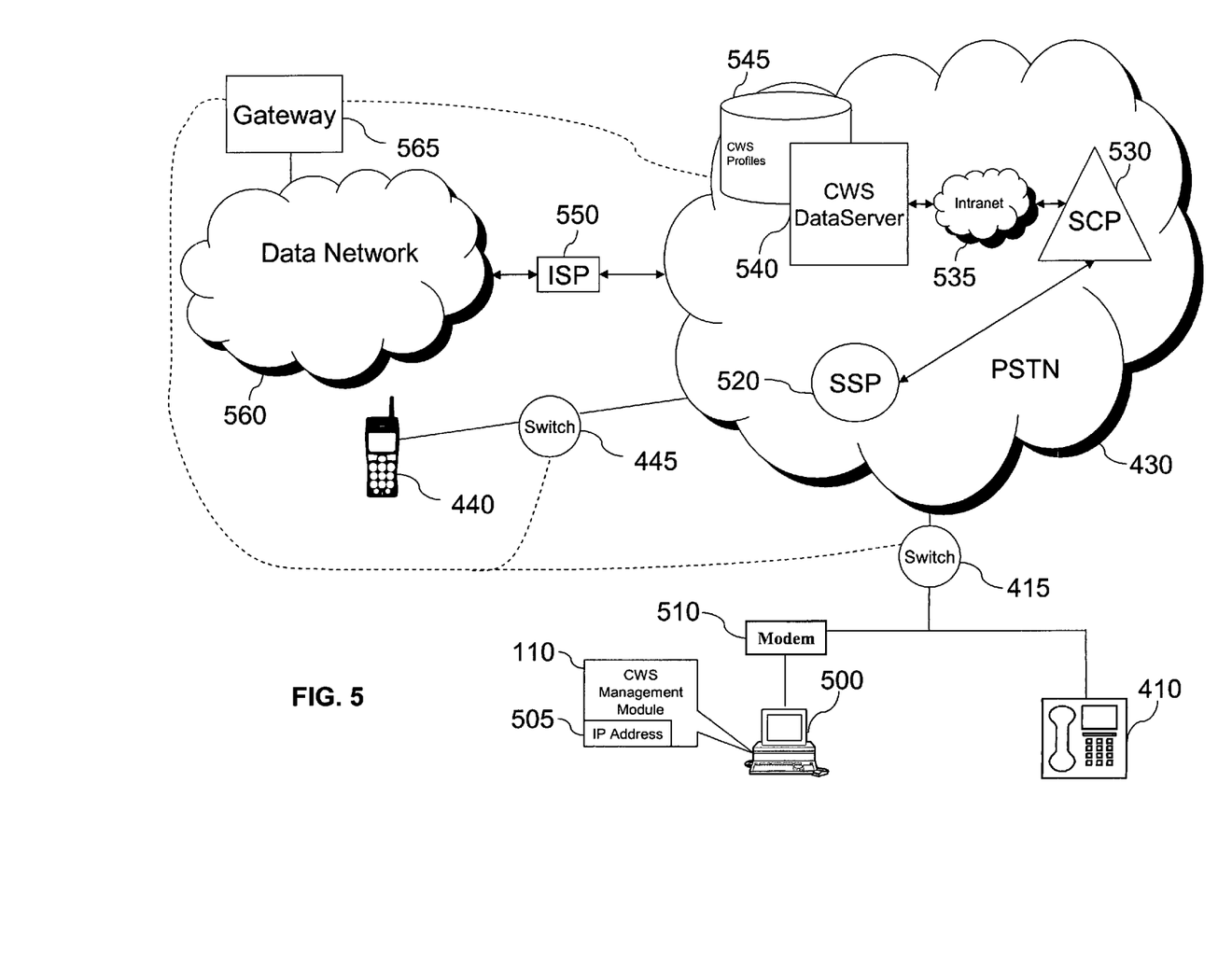
FIG. 5 is a schematic of a call waiting suppression system illustrating the communications connections of a calling party's telephone, one or more communications networks, a receiving party's telephone, and a receiving party's computer according to embodiments of this invention.

FIG. 5 shows a more detailed call waiting suppression communications system that makes use of one or more communications network to enable, disable, and/or otherwise manage call waiting suppression similar to the communications system shown in FIG. 4. The call waiting suppression communications system of FIG. 5 includes the calling party's cellular telephone 440, the communications switch 445 connected to the PSTN 430 that includes a service switching point (SSP) 520, a service control point (SCP) 530, an Intranet 535 (for the telecommunications provider to administer and program the telecommunications network components or for the customer to access and program call waiting suppression services), a call waiting suppression (CWS) Dataserver 540, a database of one or more call waiting suppression profiles 545, an Internet Service Provider (e.g., America On-Line) 550, a data network 560, a gateway 565, the destination communications switch 415 associated with the receiving party's communications address, and one or more receiving party's communications device(s) shown as telephone 410 capable of communications over the PSTN 430 and as modem 510 and personal computer 500 having the call waiting suppression program 110 (also referred to as the "Call Waiting Suppression Management Module") and an Internet Protocol address 505 to enable communications with the data network 560. Each communications switch 445, 415 enables the connected communications devices 440, 410, 500 to communicate electronic communication signals via the data network 560 (e.g., world wide electronic data network such as an Internet, an Intranet, and/or an Extranet) and/or the PSTN 430 (e.g., a central office (CO), a mobile telephone switching office (MTSO), and/or a combination CO/MTSO). The PSTN 430 may use any means of coupling one of the switches 445, 415, but the means of coupling is preferably high-capacity, high-bandwidth optical transport services, Gigabit Ethernet services, and/or the like. As those of ordinary skill in the art of telecommunications understand, the PSTN 430 could also link each of the switches 445, 415 via other appreciate means, such as, for example a Synchronous Optical Network (SONET) structure with redundant, multiple rings.

The customer may use the CWS Management Module (also referred to as the "Call Waiting Suppression Program") 110 running on personal computer 500 with Intranet 535 to access and login to the CWS DataServer 540 to establish a call waiting suppression profile in the database 545. Alternatively, an administrator of the PSTN 430 could similarly use another personal computer (not shown) and/or alternate workstation (not shown) networked with the Intranet 535 to access, add, delete, store, modify, and manage the database 545 of one or more call waiting suppression profiles. The call waiting suppression profiles control access, sharing, notification, routing, security, transactions, troubleshooting, management, and/or additional processing of call waiting suppression profiles exchanged to/from one or more communications networks customers, users, and non-customers. More specifically, the call waiting suppression profiles establish preferences for enabling call waiting suppression including (1) archiving the call waiting suppression provide to a storage device associated with the telecommunications service provider (so that a database of call waiting suppression profiles including one or more call waiting suppression profiles and/or associated communications addresses are stored), (2) encrypting the call waiting suppression profile (or a portion of the call waiting suppression profile) so that only the receiving party's communications device can enable call waiting suppression, (3) copying/archiving the call waiting suppression profile (e.g., copying the call waiting suppression profile from/to the call waiting suppression device 100 of FIG. 1 to the PSTN 430), and (4) associating the call waiting suppression profile with a variety of fields, files, and/or other data for Call Waiting Suppression Services, such as, for example login information associated with the customer, user, and/or administrator, password, telephone number(s) or Service Node(s) of the customer (this may include a plurality of addresses that are associated with a Service Node or other switch serving the receiving party's communications device), TCP/IP address of the customer, email address of the customer, profile of the calling party's communications device associated with the matched call waiting suppression profile (e.g., presentation formats of various communications devices), a time or data identifier (e.g., day of week or calendar date), other information associated with the incoming line identification (ICLID) communications signal, display and/or presentation data associated with a GUI (e.g., color, font, placement on screen, etc.), telecommunications network defaults, and call waiting suppression defaults (e.g., identify which Call Waiting indicator to suppress, specify timing parameter, etc.). Typically, the Call Waiting Suppression Profile includes data for (1) the identifier of the calling party (e.g., a name of the calling party), (2) the identifier of the incoming communications address (e.g., a phone number of the calling party's telephone), (3) the time of the incoming communication, (4) the date of the incoming communication, (5) the geographic region associated with the incoming communication, (6) caller control features to disable call waiting suppression, (7) the identifier of the calling party's communications device, (8) other ICLID information, (9) the timing parameter to suppress the Call Waiting Indicator/Alert, (10) the Call Waiting Indicator/Alert (e.g., tone, announcement, display, etc.), (11) other parameters that enable selective call waiting suppression including times of day and days of week, and (11) formatting and configuration parameters to enable call waiting suppression for various communications devices of incoming communication (e.g., calling party sending a voice/video communication from a voice/video communications device). The Call Waiting Suppression reference data provides instructions for (1) billing, (2) identification and authentication parameters, (3) parameters to enable and to bypass the disable call waiting suppression, (4) memory services for stored call waiting suppression profile data, and/or (5) configuration and formatting preference for each calling party's communications device communicating with each communications network. In addition, the data for the Call Waiting Suppression Services may include instructions for troubleshooting problems including error messages. Thus, the CWS DataServer 540 functions as a computer server, database, and processor that is dedicated to managing call waiting suppression over other connected networks (e.g., data network 560) to the receiving party's communications device 410, 500, and 510 (and other communications devices such as reference numerals 601-608 of FIG. 6).

The PSTN 430 may include wired, optical, and/or wireless elements and may further include private network elements, such as private branch exchanges (PBXs), and/or other elements (not shown). The PSTN 430 includes Advanced Intelligent Network (AIN) componentry controlling many features of the network. The PSTN 430 and/or each of the switches 415, 445 (and 425) could also include a packet-based "soft switch" that uses software control to provide voice, video, and/or data services by dynamically changing its connections data rates and protocols types. If the PSTN 430 and/or one of the switches 415, 445 should include a softswitch, the AIN componentry is replaced by an application server that interfaces with the softswitch via a packet protocol, such as Session Initiation Protocol (SIP). The means of communicating the call waiting suppression profile between or among the receiving party's communications device 410, 500, 510, the call waiting suppression device 100, the switches 415, 445 of the PSTN 430 including AIN componentry, the data network 560 including the gateway 565, and the calling party's communications device 440 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between the receiving party's communications device 410, 500, 510, the call waiting suppression device 100, the switches 415, 425, 445, the PSTN 430 including AIN componentry, the data network 560 including the gateway 565, and the calling party's communications device 440, however, are well understood in by those of ordinary skill the art and will not be further described. Further, those of ordinary skill in the art will be able to apply the principles of this invention to their own network configurations which may differ substantially from the communications system(s) shown in the figures.

Once a call is placed from the calling party's cellular phone 440 to the receiving party's communications address (e.g., telephone number of phone 410), the call is routed via switches 445, 415 over PSTN 430 as described above. The incoming communication and other communications signals (e.g., ICLID signal) associated with an address of calling party's cellular phone 440 arrive at SSP 520. The SSP suspends processing of the call and queries the SCP 530 to determine whether ring suppression is required. The SCP 530 queries the CWS DataServer 540 for further call waiting suppression profile processing and routing information. The CWS DataServer 540 accesses the database 545 of call waiting suppression profiles to determine if the receiving party's phone 410 subscribes to call waiting suppression and/or to obtain other preferences, instructions, files, and/or associated call waiting suppression data. Thereafter, the PSTN 430 may enable call waiting suppression via switch 415 to the receiving party's phone 410. For example, the PSTN 430 may route the ICLID signal and allow a, single initial audible call waiting alert to the receiving party's phone 410 (according to the matched call waiting suppression profile or default call waiting suppression parameters). Thereafter, the PSTN 430 via switch 415 (or other appropriate network hardware, equipment, and/or computer programs) deactivates and/or silences subsequent audible alerts according to the matched call waiting suppression profile (or defaults). Alternatively, the PSTN 430 may enable call waiting suppression via ISP 550 (or other connection) to the data network 560. The data network 560 then enables call waiting suppression via the gateway 565 to the receiving party's IP communications device (e.g., PC 500 and modem 510) via switch 415. Still, another alternative, is for the PSTN 430 to transmit controls that enable call waiting suppression directly to the gateway 565 (such as when the call waiting suppression profile associates a static IP address of the receiving party's IP communications device) to enable call waiting suppression of the receiving party's communications device 410, 500, 510 via switch 415. In addition to providing call waiting suppression services, the PSTN 430 may also connect the calling party's cellular phone 440 with the receiving party's telephone 410 to establish a communications connection during the ongoing conversation. That is, when the receiving party is alerted (via the initial audible alert, the visual alert, and/or a subsequent alert after call waiting suppression) of the incoming communication, the receiving party can answer the incoming communication from the calling party. For example, the receiving party may review the Caller ID (either without any audible alert or after the single, initial audible alert), and than decide to interrupt or terminate the ongoing communication so that the receiving party can answer the call to have a conversation (or alternate communication) with the calling party.

Figure 6:
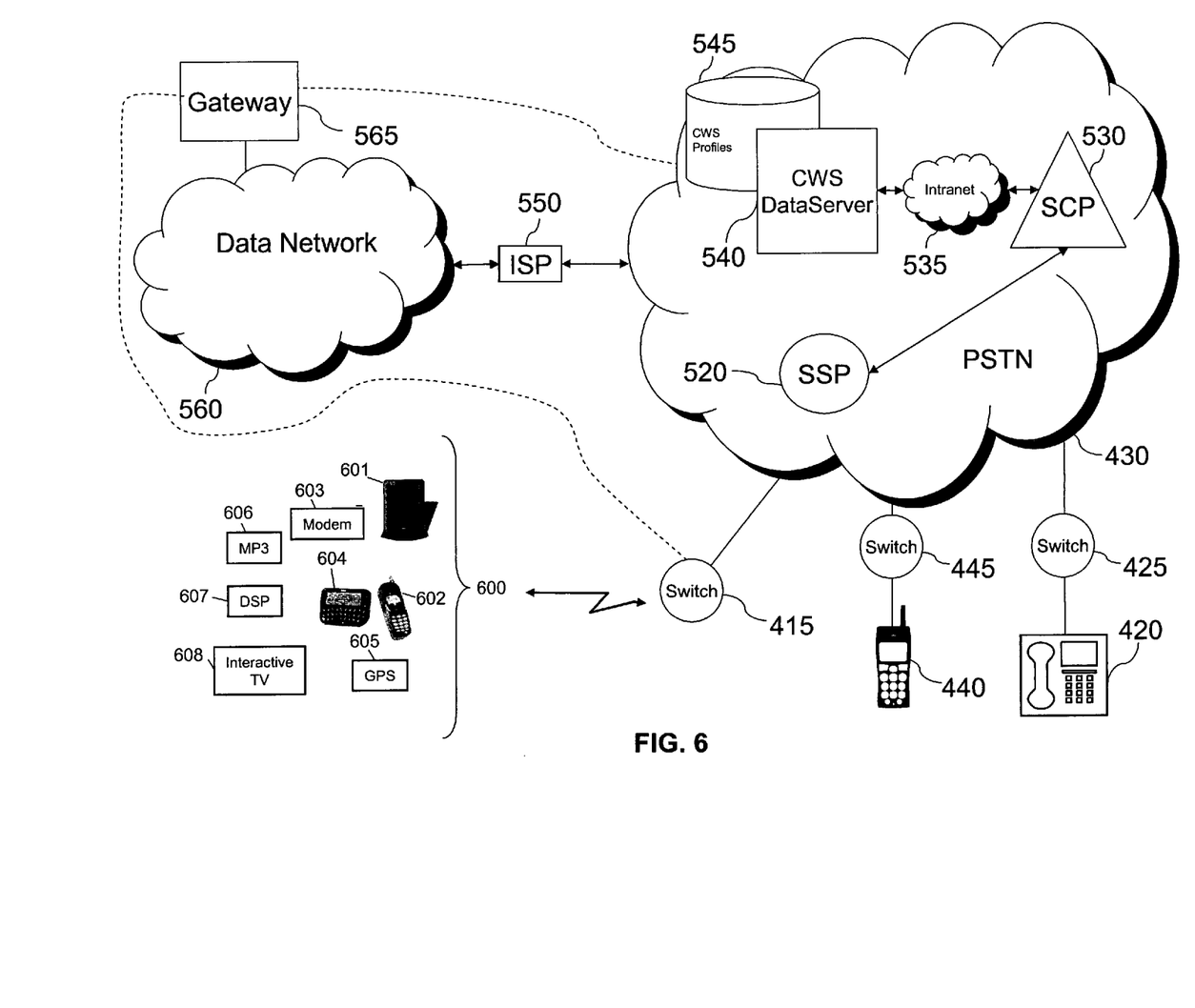
FIG. 6 is a schematic of a call waiting suppression system illustrating the communications connections of a calling party's telephone, one or more communications networks, a plurality of various receiving party communications devices, and a third party's telephone according to embodiments of this invention.

FIG. 6 is a schematic of a call waiting suppression communications system similar to the communications system disclosed in FIG. 5; however, the call waiting suppression communications system of FIG. 6 illustrates the ongoing communication with third party communications device 420 and further illustrates alternate receiving party's communications devices 600 that include a Personal Digital Assistant (PDA) 601, an IP phone 602, a modem 603, an interactive pager 604, a global positioning system (GPS) 605, an MP3/4 player 606, a digital signal processor (DSP) 607, an interactive television 608, and a satellite phone 609. Regardless of the receiving party's communications device (reference numerals 410, 500, 510, and 601-609), the PSTN 430 enables call waiting suppression and, if desired, further enables communications with the receiving party's communications device (including audio, text (e.g., ADCII), video, other digital formats, and combination thereof). Accordingly, the communications networks 430, 560 (and others) may include and/or be coupled with a multi-protocol communications interface that acts as a gateway to enable call waiting suppression. For example, if the receiving party's communications device uses the Wireless Application Protocol (WAP) technique, then call waiting suppression is enable and communications use the Wireless Mark-up Language (WML) as known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tome Multi-Frequency (DTMF), and other signaling means.

This invention further provides for caller control systems and methods to override call waiting suppression. For example, the calling party may place an incoming communication to a telephone number of the receiving party's communications device that has activated call waiting suppression (activated either by way of the customer's hardware and equipment—the call waiting suppression device 100—or by way of the communications network—the CWS Services of PSTN 420). The calling party enters an interrupt code that authorizes interruption or disabling of call waiting suppression and connects the incoming communication while maintaining all alerts/indicators of the incoming communication. The interrupt code entered by the calling party is received in a communications network, such as, for example the PSTN 420. Alternatively, the interrupt code may be received by another communications network, such as a mobile switching network, a satellite network, a data communications network (e.g., internet, intranet, and/or extranet), and other networks providing communications. The communications network detects, decodes, and processes that incoming communications signal and the interrupt code with a call waiting suppression profile associated with the receiving party's communications device. If the communications network verifies authorization to interrupt or disable call waiting suppression, then the incoming communications signal and/or an interrupt call waiting suppression signal are transmitted to the receiving party's communications device so that the incoming communication is connected and the receiving party's communications device provides a continuous alert (e.g., ringing) despite the receiving party's communications device having activated call waiting suppression services (e.g., to silence subsequent alerts of an incoming communication according to a timed parameter). Further, the communications network may send a notification message to the receiving party's communications device to notify a user that call waiting suppression is interrupted and/or disabled. For example, the notification message may be sent instead of a caller identification message so that a caller identification device or the call waiting suppressor 100 (via a display device) displays "CWS OVERRIDE" to alert the receiving party that the caller has disabled call waiting suppression.

Figure 7:
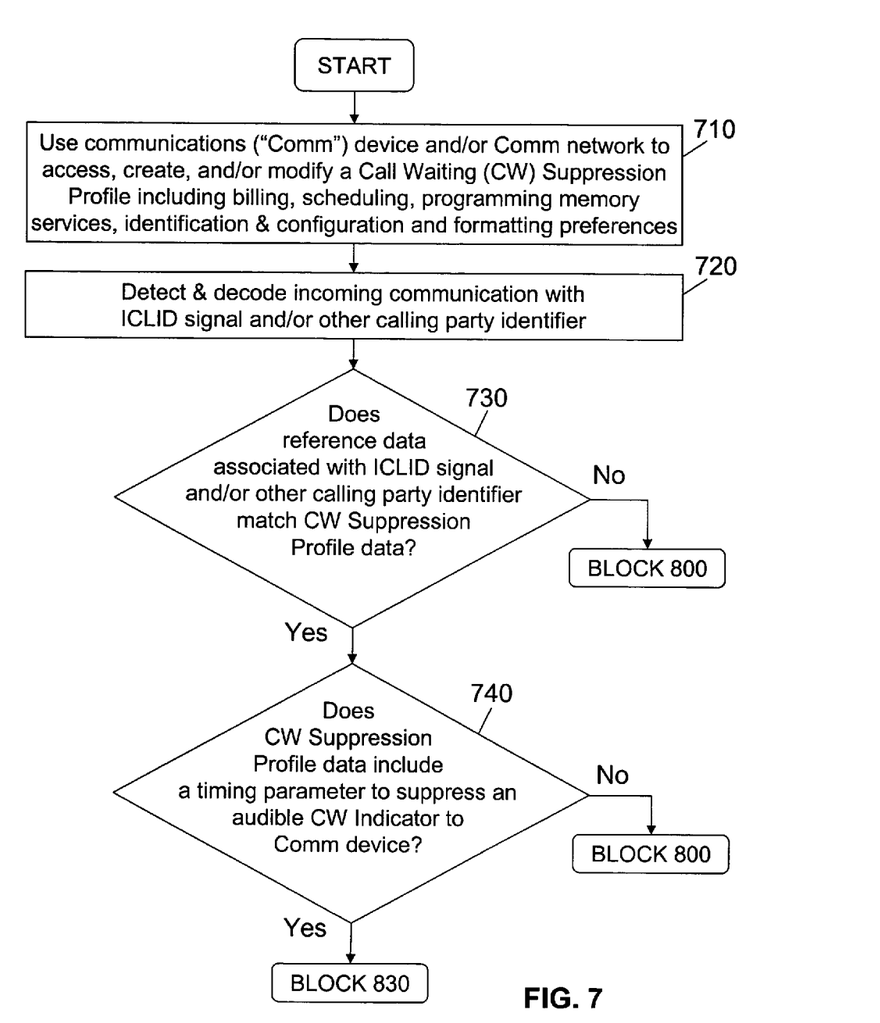
FIGS. 7-8 are flowcharts describing call waiting suppression according to embodiments of this invention.
Figure 8:
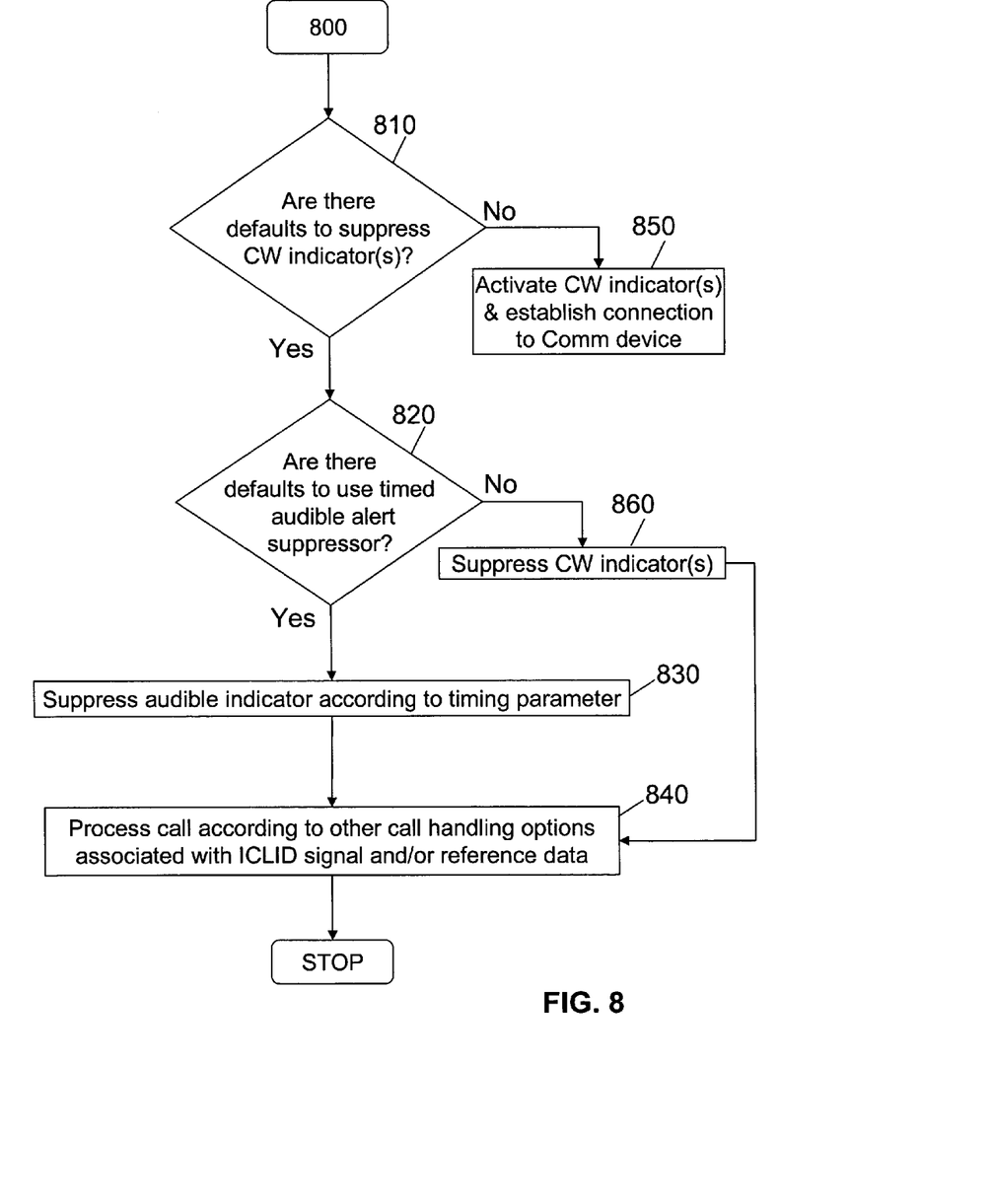

FIGS. 7 and 8 are flowcharts showing processes of providing call waiting suppression according to more embodiments of this invention. While the processes in FIGS. 7 and 8 are shown in series, these processes may occur in different orders and/or at simultaneous times as one of ordinary skill in the art will understand.

A customer uses a communications device communicating with a communications network to access, create, modify, and/or otherwise manage a call waiting suppression profile to enable call waiting suppression [block 710]. The communications network manages the call waiting suppression profile to provide call waiting suppression services that include billing for communication of the call waiting suppression signal over the communications network, scheduling call waiting suppression for times of day and days of week and for deactivating call waiting suppression for times of day and days of week, identification and authentication data associated with a receiving party's communications device, memory services for data stored with call waiting suppression signals, and/or configuration and formatting preferences for the receiving party's communications device. Alternatively, the customer could use a call waiting suppression device (such as reference numeral 100 of FIG. 1) to access, create, modify, and/or otherwise manage a call waiting suppression profile to enable call waiting suppression and to provide some of the call waiting suppression services (e.g., scheduling, memory services, etc.). Once an incoming communication is detected, the ICLID signal (and/or other reference data of the incoming communication) is decoded [720] and compared with one or more call waiting suppression profiles [block 730]. If a call waiting suppression profile matches the ICLID signal, the call waiting suppression profile is used to determine if there is a timing parameter for call waiting suppression [block 740]; and, thereafter, the call waiting indicator is suppressed according to the timing parameter [block 830] and further proceeded according to other call handling options [block 840]. If the ICLID signal is not matched with a timed suppression profile or if the timed suppression profile does not specify a timing parameter, then the process determines if there are defaults for call waiting suppression [block 810]. If no default settings are specified, then the Call Waiting indicators remain activated and alert the customer of the incoming communication [block 850]. If default settings for call waiting suppression are specified, then the process further determines if these defaults specify a timed audible alert suppressor [block 820]. If no timed audible alert defaults are specified, then the call waiting indicator is suppressed [block 860] and the call is processed according to other call handling options [block 840]. If a timed audible call waiting alert is specified, then the alert is suppressed according to the timing parameter [block 830] and the call is further processed according to other call handling options (e.g., routed to voicemail, etc.) [block 840].

While several exemplary implementations of embodiments of this invention are described herein, various modifications and alternate embodiments will occur to those of ordinary skill in the art. For example, the next generation "softswitch" simply replaces the SCP with an "application server." This application server is a conventional computer server that also includes triggers for telecommunications services so that "new entrants" into telecommunications services (e.g., new telecommunications service providers) not purchase an expensive SSP and/or SCP to process telephone calls. This next-generation packet network represents an alternative operating environment for the network enabled call waiting suppression systems, methods, programs, and apparatuses. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the PSTN and the data network (e.g., the world wide electronic communications network) to interoperate. Still, another example is using the call waiting suppression systems and methods to selectively activate and deactivate a variety of call waiting indicators/alerts of incoming communications (e.g., a vibrator, a lighted panel, a heat sensor, and/or other indicators to alert the customer of an incoming communication) according to the timing parameter. Accordingly, this invention is intended to include those other variations, modifications, and alternate embodiments that adhere to the spirit and scope of this invention.

What is claimed is:

1. A system providing call waiting suppression, comprising:
    means for processing an incoming communication to a receiving party's communications device, the receiving party's communication device already engaged in an ongoing communication;
    means for processing an incoming communications signal, the incoming communications signal from a calling party's communications device to the receiving party's communications device;
    means for associating a call waiting suppression profile with the receiving party, the call waiting suppression profile comprising a timing parameter for suppressing alerts of the incoming communications signal to the receiving party's communications device;
    means for causing an initial alert to the receiving party to alert of the incoming communication; and
    thereafter, means for suppressing subsequent alerts of the incoming communication according to the timing parameter, such that after the initial alert is caused, the subsequent alerts are deactivated.

2. The system of claim 1, further comprising means for causing an initial audible alert to the receiving party.

3. The system of claim 1, further comprising means for sending caller identification information to the receiving party, the caller identification information alerting the receiving party to the incoming communication.

4. The system of claim 1, further comprising means for silencing a second, subsequent audible alert of the incoming communication.

5. The system of claim 1, further comprising means for silencing subsequent audible alerts according to a time period defined by the timing parameter.

6. The system of claim 1, further comprising:
    means for causing an initial audible alert to the receiving party;
    means for silencing all subsequent audible alerts of the incoming communication; and
    means for sending caller identification information to the receiving party, the caller identification information alerting the receiving party to the incoming communication.

7. The system of claim 1, wherein when the incoming communication is from an unknown party, then further comprising means for suppressing the initial alert.

8. The system of claim 1, further comprising:
    means for receiving caller identification information associated with the calling party; and
    means for retrieving the timing parameter associated with the caller identification information.

9. A call waiting suppression system, comprising:
    means for receiving an incoming communications signal at a receiving party's communications device, the receiving party's communication device already engaged in an ongoing communication, the incoming communications signal identifying an incoming communication from a calling party's communications device;
    means for associating a call waiting suppression profile with the receiving party, the call waiting suppression profile comprising a timing parameter for suppressing alerts of the incoming communications signal to the receiving party's communications device;
    means for causing an initial alert to the receiving party to alert of the incoming communication; and
    thereafter, means for suppressing subsequent alerts of the incoming communication according to the timing parameter, such that after the initial alert is caused, the subsequent alerts are deactivated.

10. The system of claim 9, wherein the means for causing an initial alert comprises means for causing an initial audible alert.

11. The system of claim 9, further comprising means for receiving caller identification information that alerts the receiving party to the incoming communication.

12. The system of claim 11, further comprising means for silencing a second, subsequent audible alert of the incoming communication.

13. A method of call waiting suppression, compromising:
    receiving an incoming communications signal at a receiving party's communications device, the receiving party's communication device already engaged in an ongoing communication, the incoming communications signal identifying an incoming communication from a calling party's communications device;
    associating a call waiting suppression profile with the receiving party, the call waiting suppression profile comprising a timing parameter for suppressing alerts of the incoming communications signal to the receiving party's communications device;
    causing an initial alert to the receiving party to alert of the incoming communication; and
    thereafter, suppressing subsequent alerts of the incoming communication according to the timing parameter, such that after the initial alert is caused, the subsequent alerts are deactivated.

14. The method of claim 13, wherein causing the initial alert comprises causing an initial audible alert.

15. The method of claim 13, further comprising receiving caller identification information that alerts the receiving party to the incoming communication.

16. The method of claim 13, further comprising silencing a second, subsequent audible alert of the incoming communication.

17. The method of claim 13, wherein when the incoming communication is from an unknown party, then further comprising suppressing the initial alert.

18. A method for call waiting suppression, comprising:
processing an incoming communication to a receiving party's communications device, the receiving party's communication device already engaged in an ongoing communication;
processing an incoming communications signal, the incoming communications signal from a calling party's communications device to the receiving party's communications device;
associating a call waiting suppression profile with the receiving party, the call waiting suppression profile comprising a timing parameter for suppressing alerts of the incoming communications signal to the receiving party's communications device;
causing an initial alert to the receiving party to alert of the incoming communication; and
thereafter, suppressing subsequent alerts of the incoming communication according to the timing parameter, such that after the initial alert is caused, the subsequent alerts are deactivated.

19. The method of claim 18, wherein causing the initial alert comprises causing an initial audible alert to the receiving party.

20. The method of claim 19, wherein causing the initial alert comprises sending caller identification information to the receiving party, the caller identification information alerting the receiving party to the incoming communication.

21. The method of claim 18, wherein suppressing the subsequent alerts comprises silencing a second, subsequent audible alert of the incoming communication.

22. The method of claim 18, wherein suppressing the subsequent alerts comprises silencing subsequent audible alerts according to a time period defined by the timing parameter.

23. A computer program product comprising processor executable instructions for performing a method of call waiting suppression, the method comprising:
receiving an incoming communications signal at a receiving party's communications device, the receiving party's communication device already engaged in an ongoing communication, the incoming communications signal identifying an incoming communication from a calling party's communications device;
associating a call waiting suppression profile with the receiving party, the call waiting suppression profile comprising a timing parameter for suppressing alerts of the incoming communications signal to the receiving party's communications device;
causing an initial alert to the receiving party to alert of the incoming communication; and
thereafter, suppressing subsequent alerts of the incoming communication according to the timing parameter, such that after the initial alert is caused, the subsequent alerts are deactivated.

24. A computer program product comprising processor executable instructions for performing a method of call waiting suppression, the method comprising:
processing an incoming communication to a receiving party's communications device, the receiving party's communication device already engaged in an ongoing communication;
processing an incoming communications signal, the incoming communications signal from a calling party's communications device to the receiving party's communications device;
associating a call waiting suppression profile with the receiving party, the call waiting suppression profile comprising a timing parameter for suppressing alerts of the incoming communications signal to the receiving party's communications device;
causing an initial alert to the receiving party to alert of the incoming communication; and
thereafter, suppressing subsequent alerts of the incoming communication according to the timing parameter, such that after the initial alert is caused, the subsequent alerts are deactivated.

* * * * *